United States Patent
Minneman et al.

(10) Patent No.: US 9,482,511 B2
(45) Date of Patent: Nov. 1, 2016

(54) SYSTEM AND METHOD FOR INTERLACING DIFFERING COHERENCE LENGTH SWEEPS TO IMPROVE OCT IMAGE QUALITY

(75) Inventors: Michael Minneman, Lafayette, CO (US); Jason Ensher, Lafayette, CO (US); Michael Crawford, Lafayette, CO (US); Thomas Milner, Lafayette, CO (US)

(73) Assignee: Insight Photonic Solutions, Inc., Lafayette, CO (US)

( * ) Notice: Subject to any disclaimer, the term of this patent is extended or adjusted under 35 U.S.C. 154(b) by 328 days.

(21) Appl. No.: 13/555,108

(22) Filed: Jul. 21, 2012

(65) Prior Publication Data

US 2013/0044329 A1 Feb. 21, 2013

Related U.S. Application Data

(60) Provisional application No. 61/510,790, filed on Jul. 22, 2011.

(51) Int. Cl.
*G01B 9/02* (2006.01)

(52) U.S. Cl.
CPC ....... *G01B 9/02004* (2013.01); *G01B 9/02009* (2013.01); *G01B 9/02082* (2013.01); *G01B 9/02087* (2013.01); *G01B 9/02091* (2013.01)

(58) Field of Classification Search
CPC .................................................. G01B 9/02009
USPC ........................................ 356/479, 497, 504
See application file for complete search history.

(56) References Cited

U.S. PATENT DOCUMENTS

| | | | | |
|---|---|---|---|---|
| 5,301,010 A | * | 4/1994 | Jones et al. | 356/479 |
| 5,975,697 A | * | 11/1999 | Podoleanu | A61B 3/102 |
| | | | | 351/206 |
| 6,548,320 B1 | * | 4/2003 | Kamath | 438/45 |
| 2007/0019208 A1 | * | 1/2007 | Toida et al. | 356/511 |
| 2007/0076219 A1 | * | 4/2007 | Toida | 356/511 |
| 2007/0115477 A1 | * | 5/2007 | Teramura et al. | 356/479 |
| 2009/0185191 A1 | * | 7/2009 | Boppart et al. | 356/479 |
| 2010/0280315 A1 | * | 11/2010 | Pan | 600/109 |
| 2011/0080591 A1 | * | 4/2011 | Johnson et al. | 356/479 |

OTHER PUBLICATIONS

Fercher, A F et al.; Optical coherence tomography—principles and applications; Institute of Physics Publishing; Reports on Progress in Physics, 66 (2003) 239-303; Institute of Medical Physics, University of Vienna, Waehringer Strasse 13, A-1090 Wien, Austria.

* cited by examiner

*Primary Examiner* — Hwa Lee
(74) *Attorney, Agent, or Firm* — Renner, Otto, Boisselle and Sklar LLP

(57) ABSTRACT

A system and method for sweeping electromagnetic radiation over a first coherence length and a second length over a range of wavelengths to generate an image. Electromagnetic radiation having a first coherence length is generated and swept over a range of wavelengths. Electromagnetic radiation having a second coherence length is generated and swept over a range of wavelengths. The electromagnetic radiation is splitting through a reference path and a sample path; Electromagnetic radiation returned from the reference path and the sample path is detected, wherein the detector generates output signals corresponding to the received electromagnetic radiation. In one embodiment, the output signals are processed to generate an image. The image may be interleaved with data corresponding to the electromagnetic radiation having the first coherence length and the second coherence length.

10 Claims, 3 Drawing Sheets

SYSTEM AND METHOD FOR INTERLACING DIFFERING COHERENCE LENGTH SWEEPS TO IMPROVE OCT IMAGE QUALITY

RELATED APPLICATION DATA

This application claims the benefit of U.S. Provisional Application No. 61/510,790, filed Jul. 22, 2011, which is hereby incorporated in by reference.

TECHNICAL FIELD

The present invention relates generally to a system and method to improve optical coherence tomography (OCT) image quality by interlacing differing coherence length sweeps from a swept-wavelength laser for improving image quality.

BACKGROUND

Speckle is a source of image quality aberration in OCT systems, wherein the laser light interferes with itself within the tissue being imaged. This results in image degradation commonly referred to as "speckle" creating dark spots (also referred to as "noise") in the image. In an ideal setting, the only interference signal is generated from the light from the tissue with another version of the light in the other arm of the interferometer used in the OCT measurement. Unfortunately, the light can also interfere with itself as it variously reflects off the various layers of tissue as well, actually interfering within the tissue. It has often been assumed that this speckle is a natural and primarily unavoidable artifact of OCT measurement.

SUMMARY

It has been discovered that if the coherence length is roughly equivalent to the actual path length difference in the interferometer, then the actual speckle will be affected by relatively minor changes in that coherence length. If the laser itself can be adjusted to provide two or more interleaved sweeps of differing coherence length, then the data from these different sweeps can be combined or contrasted to provide additional information regarding the tissue in the area, which was obscured by the speckle.

Aspects of the present invention relate to a system and method to improve optical coherence tomography (OCT) image quality by interlacing differing coherence length sweeps from a swept-wavelength laser for improving image quality. The system and method may also improve measurements made in microscopy, optical frequency-domain reflectometry (OFDR) and light detection and ranging (LI-DAR) systems, for example.

The system relates generally to performing two or more interleaved sweeps of differing coherence length and either provide both images or a single image based on the results from both sweeps. In one embodiment, data from the multiple sweeps of differing coherence lengths are combined to create a single image that more accurately reproduces the characteristics of the tissue.

One aspect of the invention relates to a system including: at least one electromagnetic radiation source operable to generate electromagnetic radiation at a first coherence length through a first range of wavelengths and at a second coherence length through a second range of wavelengths; an interferometer coupled to the at least one electromagnetic radiation source, wherein the interferometer includes a reference path and a sample path; a detector for receiving electromagnetic radiation returned from the reference path and the sample path, wherein the detector generates output signals corresponding to the received electromagnetic radiation; and a controller coupled to the detector and the at least one electromagnetic radiation source, wherein the controller selectively causes electromagnetic radiation to be generated at the first coherence length and the second coherence length and the controller processes the output signals to generate image signals from the electromagnetic radiation generated from at the first coherence length and the second coherence length.

Another aspect of the invention relates to a method for sweeping electromagnetic radiation over a first coherence length and a second length over a range of wavelengths to generate an image, the method including: generating electromagnetic radiation having a first coherence length and a second coherence length through the range of wavelengths and the electromagnetic radiation associated with the first coherence length or the second coherence length is output at a given time; splitting the electromagnetic radiation through a reference path and a sample path; detecting electromagnetic radiation returned from the reference path and the sample path, wherein the detector generates output signals corresponding to the received electromagnetic radiation; and processing the output signals to generate an image.

A number of features are described herein with respect to embodiments of the invention. It will be appreciated that features described with respect to a given embodiment also may be employed in connection with other embodiments.

The invention comprises the features described herein, including the description, the annexed drawings, and, if appended, the claims, which set forth in detail certain illustrative embodiments. These embodiments are indicative, however, of but a few of the various ways in which the principles of the invention may be employed.

DESCRIPTION

Figure 1:
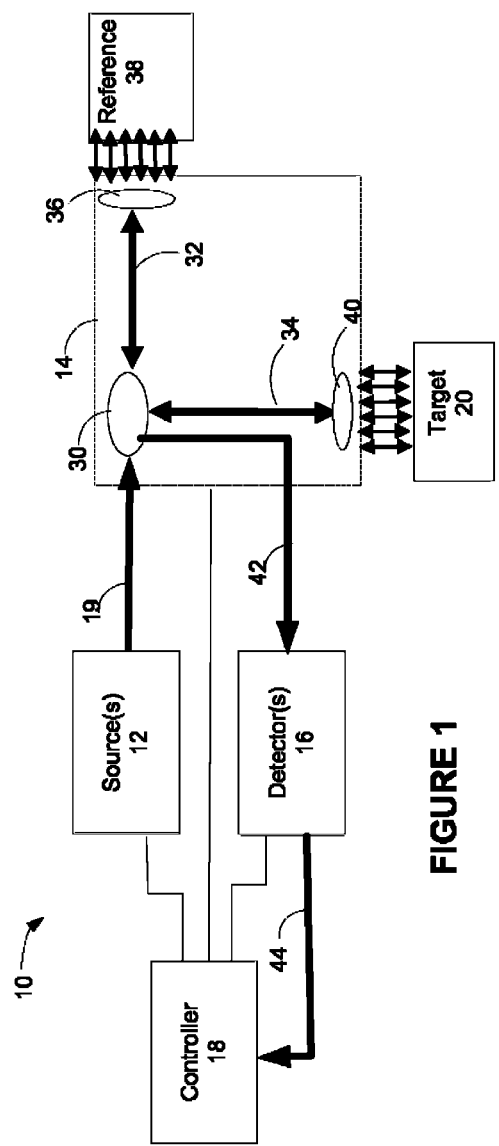
FIGS. 1-2 are exemplary systems in accordance with aspects of the present invention.

An exemplary swept electromagnetic radiation system 10 in accordance with aspects of the present invention is illustrated in FIG. 1. Referring to FIG. 1, the system 10 includes at least one electromagnetic radiation source 12, an interferometer 14 (identified by dashed lines); a detector 16 and a controller 18. Electromagnetic radiation 19 is directed from the at least one radiation source 12 to a target 20 to detect a physical characteristic associated with the target, as discussed herein.

The at least one electromagnetic radiation source 12 is operable to generate electromagnetic radiation having a first coherence length through a first range of wavelengths. In one embodiment, electromagnetic radiation source 12 is operable to generate electromagnetic radiation having a second coherence length (distinct from the first coherence length) over the same or a different range of wavelengths.

In one embodiment of the present invention, at least one electromagnetic radiation source 12 is an electronically tunable laser. The electronically tunable laser may be a semiconductor laser that is electronically tunable to discretely adjust the coherence length between at least two lengths. For example, the electronically tunable laser may be a Vernier-tuned distributed Bragg reflector (VTDBR) laser. The output wavelength of the VTDBR laser may be electronically-tuned by adjusting one or more input currents to the device. In one exemplary illustration, the device may be tuned by changing up to 5 different input currents to the device. By electronic tuning the output wavelength of the emitted electromagnetic radiation, the source 12 can be programmed and/or controlled by the controller 18 output electromagnetic radiation at a desired coherence length over a desired wavelength range. The source 12 may then be controlled to switch immediately to a different coherence length for the next scan. Other embodiments of the invention may comprise used of tunable lasers such as Vertical-Cavity Surface-Emitting Lasers (VCSELs) or multi-section lasers such as Super-Structure Grating DBR lasers (SSG-DBRs), Digital Supermode DBR lasers (DS-DBRs) or Y-Branch lasers.

In one embodiment, a predetermined period of time elapses during the transition of the source between the first coherence length and the second coherence length. The predetermined period of time may be any desired time. One design criterion is to minimize the period of time to shorten the sweep duration and have the period of time large enough to prevent interference between the electromagnetic radiation having different coherent lengths.

As discussed above, the electromagnetic radiation source 12 is operable to output electromagnetic radiation having a first coherence length and a second coherence range over a range or ranges of wavelengths. The source 12 may be electronically tunable to discretely output the electromagnetic radiation at the desired coherence length.

Figure 2:
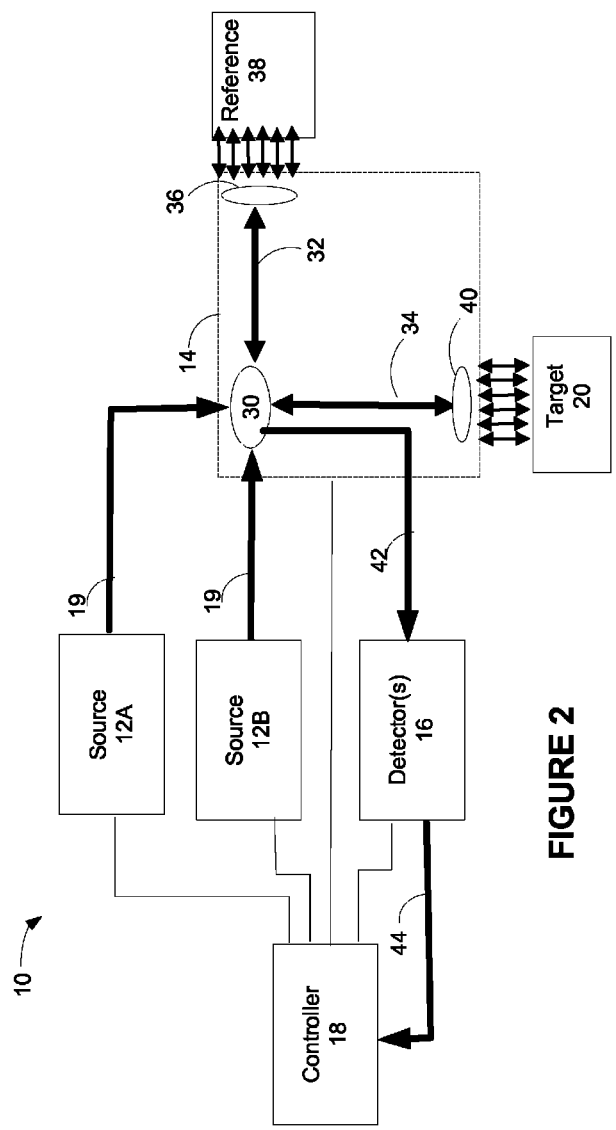

In another embodiment, illustrated in FIG. 2, the radiation source 12 includes two discrete sources (12A, 12B) of electromagnetic radiation. Each source 12A, 12B is operable to generate electromagnetic radiation at fixed coherence length through a range of wavelengths. The sources 12A, 12B may be any source of electromagnetic radiation. The sources may be the same or different sources of electromagnetic radiation. For example, one source may be a semiconductor laser and another source may be another source (such as an external cavity diode laser or tunable solid-state laser). Any combination of sources of electromagnetic radiation is deemed to fall within the scope of the present invention.

As stated above, a predetermined period of time elapses between transition between the first source of electromagnetic radiation 12A and the second source of electromagnetic radiation 12B and vice versa.

The interferometer, identified generally by the dashed lines 14, may be coupled to the one or more electromagnetic radiation sources 12 by a coupler 30. Any type of interferometer may be used in accordance with aspects of the present invention. Exemplary interferometers include, for example: a Mach-Zehnder interferometer, a Michelson interferometer, a Fabry-Perot interferometer, etc. The interferometer 14 may include fewer components or more components than identified within the confines of the dashed line. The illustrated interferometer 14 is exemplary and provided to assist one skilled in the art in understanding aspects of the present invention.

Generally, the coupler 30 splits the received electromagnetic radiation into a reference path 32 and a target path 34. For the reference path 32, the electromagnetic radiation is output through a lens unit 36 and reflected off a reference 38. In one embodiment, the reference 38 may be a mirror or any known reference reflector with partial reflectivity. For the target path, the electromagnetic radiation is output through a lens unit 40 and reflected off a target 20. The target 20 may be any desirable target. Exemplary targets include, for example, human tissue, inanimate objects, etc.

Radiation returning from the reference path 32 and the target path 34 travels through the respective lens unit (e.g., 36, 40) and is combined with the coupler 30 or another beam combining component to form signal 42, as is known in the interferometry art. The coupler 30 may be any type of device that may be used to split or route electromagnetic radiation received (e.g., signal 19) into two or more radiation paths (e.g., paths 32, 34) and/or join two or more received radiation paths into a single signal (e.g., signal 42). For example, the coupler may be a splitter for separating and/or combining optical mediums (e.g., a fiber optic cable, etc.), a beam splitter and the like. As shown in FIG. 1, the coupler 30 may be a 3 dB coupler that splits the incoming light into two separate radiation paths (e.g., reference path 32 and target path 34) of approximately equal intensity of light. The two radiation paths 32 and 34 may be recombined after the electromagnetic radiation has traversed separate radiation paths to 32, 34 at the coupler 30 and/or a different coupler (not shown).

After the electromagnetic radiation has traversed one of the reference path 32 or the target path 34, the coupler 30 may combine the received electromagnetic radiation into a single output signal 42. In this case, the output signal is a fringe pattern of amplitude vs. time or spatial dimension that may be detected by a detector 16 (e.g., a photodetector, a phase detector, frequency detector, linear detector array or other suitable detector). The coupler 30 functions to combine the electromagnetic radiation that has traversed radiation paths 32, 34. One of ordinary skill in the art will readily appreciate that the output signal and the detector may vary based on the electromagnetic radiation, wavelength, frequency and/or range used in conjunction with the system.

The detector 16 receives electromagnetic radiation 42 returned from the reference path 32 and the target (also referred herein as sample) path 34. The combined, interfered electromagnetic radiation (e.g., signal 42) is received by the detector 16. The detector 16 may be a single channel and/or a multi-channel detector. The detector 16 generates one or more output signals 44 that are based on the received electromagnetic radiation from the reference path 32 or target path 34.

The output signals 44 are received by controller 18. The controller 18 is coupled to the interferometer 14, the detector 16 and the at least one electromagnetic radiation source 12. The controller 18 selectively causes the source 12 to generate electromagnetic radiation at the first coherence length and the second coherence length.

Figure 3:
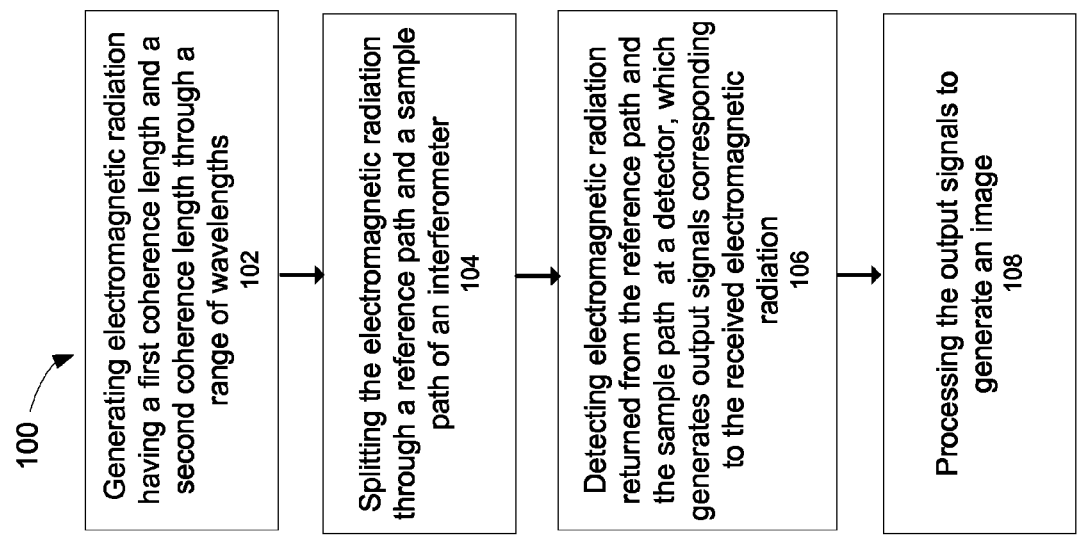
FIG. 3 is an exemplary method in accordance with aspects of the present invention.

The controller 18 processes the output signals to represent data corresponding to amplitude and distance information detected by the detector 16. For example, a graph of reflection amplitude vs. distance may be created for each scan at each coherence length. A single scan of the electromagnetic radiation source produces a one-dimensional graph. The output signals of multiple scans may be combined to generate one or more image signals. For example, multiple scans of one-dimensional graphs are used to assemble a two-dimensional representation of data that relates to the target, as is conventional. Preferably, the controller processes the output signals to generate image signals from the electromagnetic radiation generated at the first coherence length and the second coherence length. The image signals may be interleaved image signals generated from the electromagnetic radiation generated at the first coherence length and the second coherence length. In another embodiment, the image signals are discrete image signals generated from the electromagnetic radiation generated from at the first coherence length and the second coherence length. An exemplary method 100 in accordance with aspects of the present invention is illustrated in FIG. 3. The exemplary method 100 is for sweeping electromagnetic radiation over a first coherence length and a second length over a range of wavelengths to generate an image.

At block 102, the method includes generating electromagnetic radiation having a first coherence length and a second coherence length through the range of wavelengths and the electromagnetic radiation associated with the first coherence length or the second coherence length is output at a given time. As set forth both, any combination of sources may be used to generate the electromagnetic radiation having different coherence lengths. For example, two fixed sources having different coherence lengths may be used. Alternatively, one fixed source and one source having changeable coherence length may be used. In another embodiment, two sources both having changeable coherence lengths may be used.

The output from each source occurs a given time distinct from each other. For example, a predetermined period of time elapses between transition from one source to another. This could be referred to as interlacing the output sweeps of differing coherence lengths.

At block 104, the electromagnetic radiation is split through a reference path and a sample path of an interferometer.

At block 106, electromagnetic radiation returned from the reference path and the sample path is detected at a detector. The detector generates output signals corresponding to the received electromagnetic radiation.

At block 108, the output signals are processed to generate an image. The image may be formed by combining output signals associated with the first coherence length and the second coherence length. In another embodiment, data associated with the first coherence length and the second coherence length are interleaved to generate the image. In yet another embodiment, distinct images are formed corresponding to the first coherence length and the second coherence length. The resulting output signals and/or the images may be electronically stored for any desired purpose.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

What is claimed is:

1. A system comprising:
   at least one semiconductor tunable laser source operable to generate electromagnetic radiation at a first coherence length through a first range of wavelengths and at a second coherence length through a second range of wavelengths, wherein the first coherence length is different from the second coherence length;
   an interferometer coupled to the at least one semiconductor tunable laser source, wherein the interferometer includes a reference path and a sample path;
   a detector for receiving electromagnetic radiation returned from the reference path and the sample path, wherein the detector generates output signals corresponding to the received electromagnetic radiation; and
   a controller coupled to the detector and the at least one semiconductor tunable laser source, wherein the controller:
      selectively causes electromagnetic radiation to be generated at the first coherence length through the first range of wavelengths and at the second coherence length through the second range of wavelengths, wherein the coherence length is maintained at the first coherence length throughout the first range of wavelengths, the coherence length is maintained at the second coherence length throughout the second range of wavelengths, and the first range of wavelengths is identical to the second range of wavelengths; and
      processes the output signals to generate image signals from the electromagnetic radiation maintaining the first coherence length and electromagnetic radiation maintaining the second coherence length.

2. The system of claim 1, wherein the image signals are interleaved image signals generated from the electromagnetic radiation generated at the first coherence length and the second coherence length.

3. The system of claim 1, wherein the image signals are discrete image signals generated from the electromagnetic radiation generated from at the first coherence length and the second coherence length.

4. The system of claim 1, wherein the semiconductor laser is a sample grating distributed Bragg reflector (SG-DBR) laser.

5. The system of claim 1, wherein the at least one semiconductor tunable laser source includes two distinct laser sources.

6. The system of claim 5, wherein at least one of the at least one laser source has a fixed coherence length.

7. A method for sweeping electromagnetic radiation output by a semiconductor tunable laser at a first coherence length through a range of wavelengths and at a second coherence length through the identical range of wavelengths to generate an image, the method comprising:
   causing the semiconductor tunable laser to generate electromagnetic radiation having a first coherence length and a second coherence length through the identical range of wavelengths and the electromagnetic radiation associated with the first coherence length or the second coherence length is output by the semiconductor tunable laser at a given time, wherein,
      the first coherence length is different from the second coherence length;
      when sweeping electromagnetic radiation maintaining the first coherence length, the first coherence length is maintained throughout the range of wavelengths: and
      when sweeping electromagnetic radiation maintaining the second coherence length, the second coherence length is maintained throughout the identical range of wavelengths; and
   splitting the electromagnetic radiation through a reference path and a sample path;
   detecting electromagnetic radiation returned from the reference path and the sample path, wherein the detector generates output signals corresponding to the received electromagnetic radiation; and
   processing the output signals to generate an image.

8. The method of claim 7, wherein the image is formed by combining output signals associated with the first coherence length and the second coherence length.

9. The method of claim 8, wherein data associated with the first coherence length and the second coherence length are interleaved to generate the image.

10. The method of claim 7, wherein distinct images are formed corresponding to the first coherence length and the second coherence length.

\* \* \* \* \*